United States Patent Office 2,838,150
Patented June 10, 1958

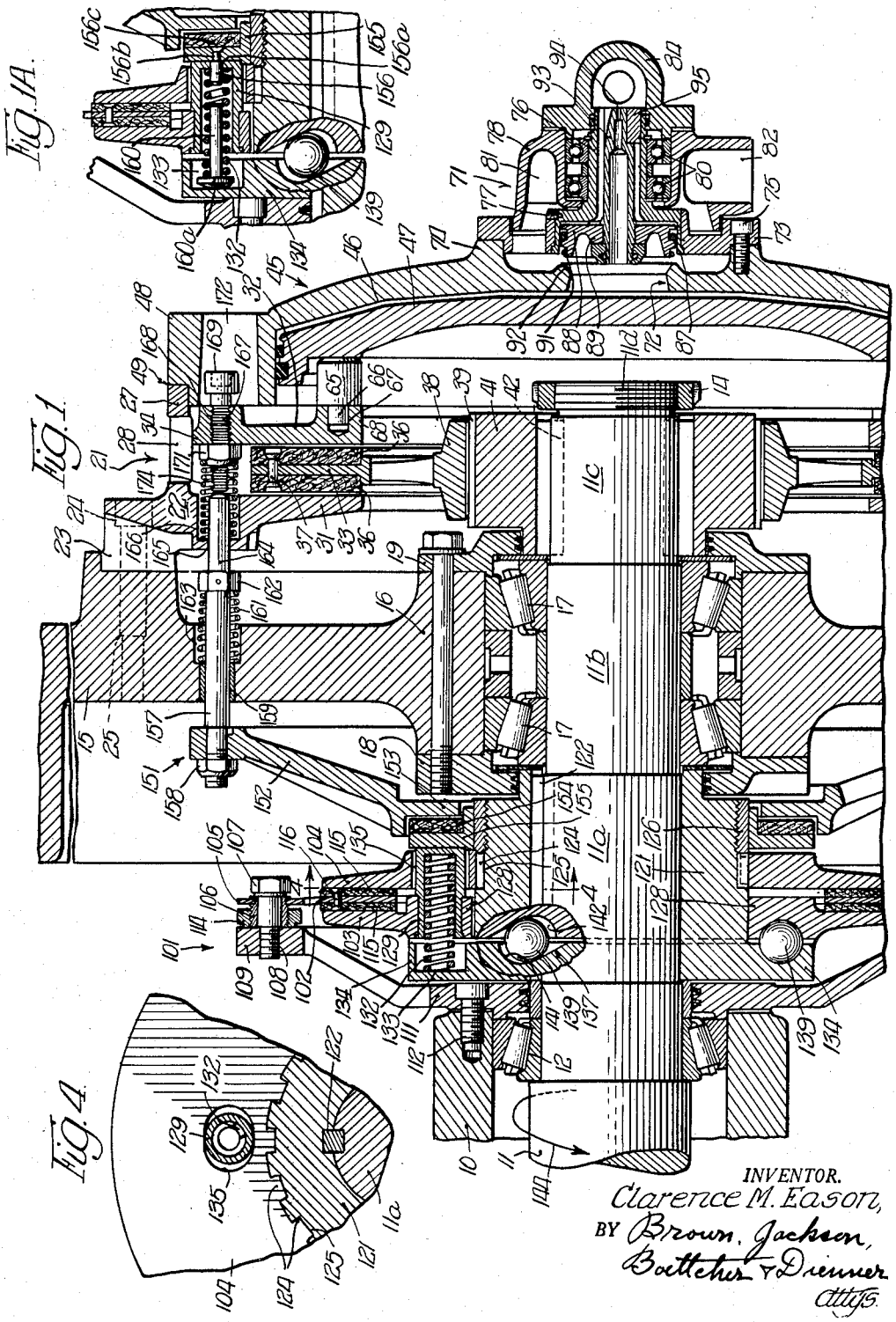

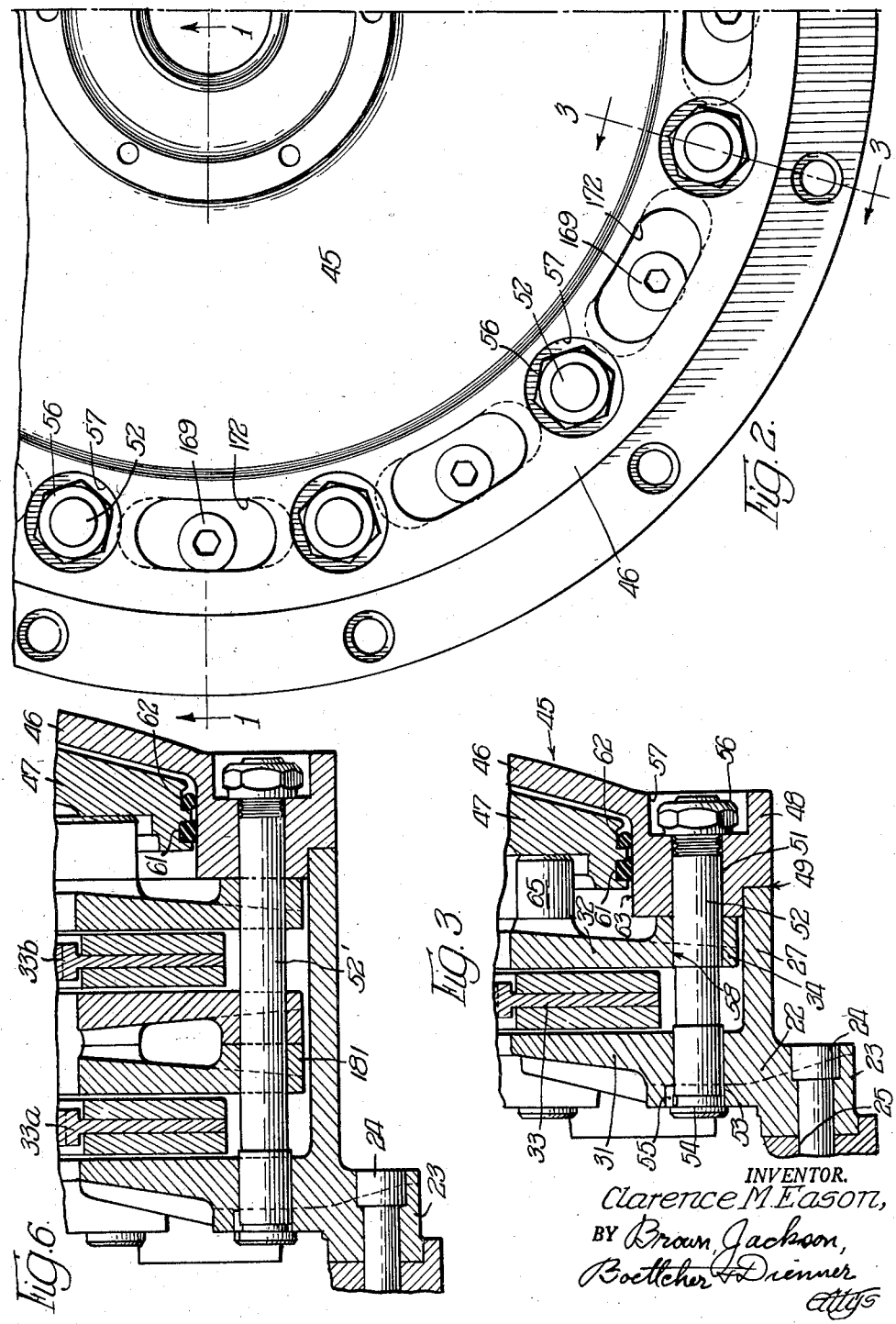

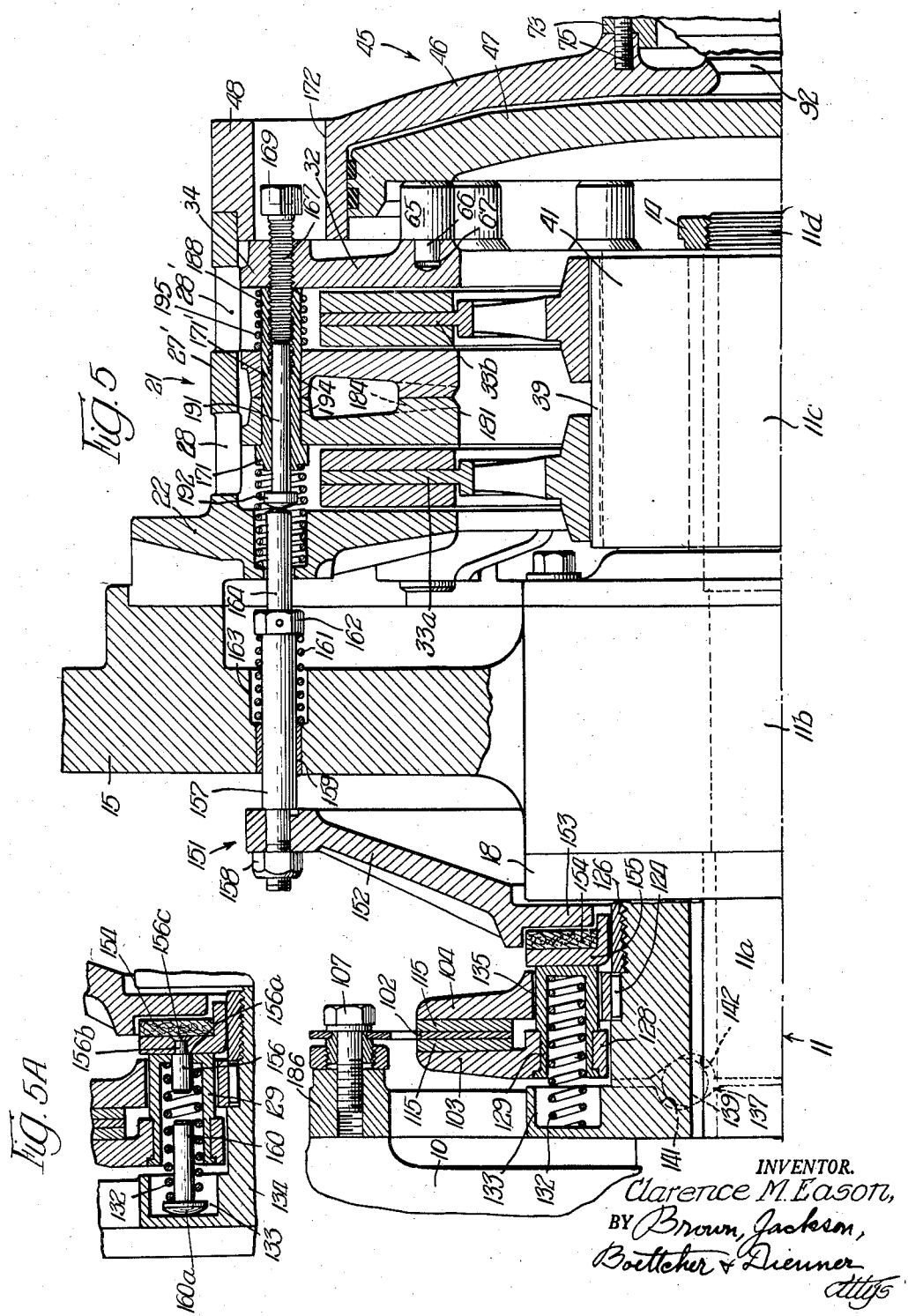

2,838,150

INTERCONNECTED CLUTCH AND BRAKE MECHANISM

Clarence M. Eason, Waukesha, Wis., assignor to Industrial Clutch Corporation, Waukesha, Wis., a corporation of Wisconsin Application October 29, 1954, Serial No. 465,649

16 Claims. (Cl. 192—18)

The present invention relates generally to interconnected clutch and brake mechanism, and more particularly to a compressed air operated clutch and a mechanically interconnected brake designed to provide a safe, quick and extremely accurate control for punch presses, power shears and similar machines requiring start-stop operation. This application is a continuation-in-part of my copending application Serial No. 368,585, filed July 17, 1953.

The operation of releasing the brake and engaging the clutch is performed by a compressed air power unit, which, upon receiving compressed air, operates through the mechanical interconnection to release the brake and to thereafter engage the clutch.

The reverse operation of releasing the clutch and engaging the brake is performed by spring pressure, arranged whereby as soon as the compressed air is released from the power unit this spring pressure becomes effective to release the clutch and thereafter engage the brake. By virtue of this constant tendency of the brake to engage under the action of spring pressure, any failure of the air presure, or any failure of the air valve controls, will cause immediate release of the clutch and engagement of the brake, thereby making the equipment "fail safe." The mechanical interconnection between the clutch and the brake insures that the brake is released before the clutch can be engaged, and also makes it impossible to engage the brake without first releasing the clutch. When the brake is "on," the clutch is "out." When the clutch is "in," the brake is "off." This construction insures positive control of press operation. At no time are the clutch and brake engaged simultaneously. Therefore, no excessive wear or heating occurs such as would result from the clutch and brake working against each other.

In a typical installation of my invention, the clutch and brake mechanism is mounted on a driven shaft projecting outwardly from the frame of the punch press, power shear or like machine, on which shaft is also mounted the driving fly wheel or other constantly rotating driving element, which is adapted to be coupled to the driven shaft through my improved clutch mechanism. In this regard, another feature or object of the invention is to provide an improved construction and arrangement in which the clutch mechanism is mounted on the outer side of the driving fly wheel, and the brake mechanism is mounted on the inner side of the driving fly wheel, between the fly wheel and the frame, and in which the two mechanisms are interconnected by motion transmitting parts passing transversely through the fly wheel.

By having the clutch mechanism located on the outer side of the driving fly wheel, the compressed air cylinder and piston can be mounted directly on the outer side of the clutch mechanism, preferably just beyond the outer end of the driven shaft. This enables the compressed air control valve to be located directly on the compressed air cylinder, or in immediate proximity thereto, with the result that there is a minimum length of air passageway between the air valve and the air cylinder for obtaining a more rapid flow of air between the control valve and the cylinder in the admission of compressed air to the cylinder and in the exhausting of air therefrom. In certain classes of machines, such as in high speed punch presses, it is quite important to be able to locate the control valve either on or in immediate proximity to the compressed air cylinder so as to reduce to the shortest possible interval the length of time required for travel of air between the control valve and cylinder.

Referring now to the improved construction and location of the brake mechanism, it is very advantageous to have it located between the driving fly wheel and the frame of the machine, because the braking torque can then be borne by the frame of the machine directly, without the complication of providing special torque transmitting rods, yokes or the like for sustaining the braking torque.

Another object of the invention is to provide an improved construction of interconnecting mechanism between the clutch and the brake which can be quickly and easily adjusted to facilitate installation of the mechanism and insure accurate operation thereof, and also to compensate for wear of the mechanism after lengthy service.

Another object of the invention is to provide an interconnected clutch and brake mechanism in which the brake engaging force is augmented by self-energizing mechanism, preferably of the ball cam type. In punch press installations where the brake is applied by spring pressure, the braking effort necessary to stop a high speed press is so great that it is almost physically impossible to find an adequate amount of room for the number and size of springs necessary to apply the brake with adequate pressure. Furthermore, if sufficient space is provided for the necessary number and size of springs to provide adequate braking force, then it becomes necessary to increase the effective area of the air cylinder so as to provide sufficient axial pressure under air energization to hold the brake released and the clutch engaged. These objections are avoided in my improved construction because by providing this ball cam self-energizing type of brake I can employ relatively low pressure brake springs, and at the same time create a very powerful braking force, due to the action of the ball cam self-energizing mechanism, the latter being effective to stop the rotating parts, but not requiring heavy actuating forces to release the brake or to hold the brake disengaged.

Other objects, features and advantages of the invention will be apparent from the following detail description of two preferred embodiments thereof. In the accompanying drawings illustrating such embodiments:

Figure 1 is a fragmentary axial sectional view of one embodiment of my invention wherein the clutch mechanism has only a single driven clutch disk, this view corresponding to a section taken approximately on the plane of the line 1—1 of Figure 2;

Figures 1A illustrates a different construction at the brake end of this embodiment;

Figure 2 is a fragmentary elevational view of the outer or front end of this assembly, and particularly of the compressed air power unit mounted on the outer side of the clutch mechanism;

Figure 3 is a fragmentary transverse section taken approximately on the plane of the line 3—3 of Figure 2;

Figure 4 is a fragmentary detail section taken approximately on the plane of the line 4—4 of Figure 1;

Figure 5 is a sectional view similar to Figure 1 illustrating a modified embodiment wherein the clutch mechanism comprises two driven clutch disks;

Figure 5A illustrates the different construction of Figure 1A as applied to the embodiment of Figure 5; and Figure 6 is a fragmentary longitudinal sectional view taken on a plane corresponding to the plane of the section of Figure 3, but illustrating the modified embodiment of Figure 5.

The frame of the punch press, power shear, or other machine is indicated generally at 10, and the shaft extending from this machine that requires start-stop operation is indicated at 11. This end portion of the shaft has bearing support in the frame 10, such as by the anti-friction bearings 12 shown in Figure 1, or by plain sleeve bearings, as desired. The driven shaft 11 has successively reduced portions 11a, 11b and 11c, and has a threaded end portion 11d over which screws a nut 14 for holding the clutch and brake assembly on the shaft.

Rotatably mounted on the intermediate reduced portion 11b of the shaft is the driving fly wheel 15 to which the driving energy is transmitted, preferably by belt power. The hub 16 of the fly wheel 15 is rotatably supported on the shaft portion 11b by anti-friction bearings 17, and this hub 16 has bolted to opposite ends thereof lubricant retaining rings 18 and 19 which seal lubricant in the anti-friction bearings 17.

The clutch mechanism is designated 21 in its entirety, and is mounted on the outer side of the driving fly wheel, as previously described. The clutch comprises an annulus or ring-shaped member 22, from the inner face of which project at spaced intervals a plurality of apertured mounting bosses 23. Cap screws 24 pass through these apertured mounting bosses and thread into tapped bores 25 in the web of the fly wheel 15, thereby rigidly securing the ring or annulus 22 to the fly wheel. This ring or annulus 22 is formed with an axially extending mounting flange 27 having spaced apertures 28 therein for cooling and access purposes. The ring or annulus 22 also comprises a radially extending, non-shiftable driving clutch plate 31. Spaced outwardly therefrom is the cooperating shiftable driving clutch plate 32, and interposed between these two driving clutch plates 31 and 32 is a driven clutch disk 33. The shiftable driving clutch plate 32 is approximately centered and guided for shifting movement by a slidable mounting on through bolts 52 (Figure 3) passing through guide apertures in a flange 34 projecting from the shiftable clutch plate 32, as will be later described.

The driven clutch disk 33 has rings or segments of friction facing material 36 secured to opposite sides of the clutch disk, as by rivets 37. It will be understood that when the shiftable driving clutch plate 32 is shifted axially toward the left, it compresses the driven clutch disk between itself and the non-shiftable driving clutch plate 31 for transmitting driving torque from the fly wheel 15 to the shaft 11. The driven clutch disk 33 comprises a hub 38 which has a splined mounting 39 upon a main hub 41, secured to the shaft portion 11c by a driving key 42. The splined mounting 39 enables the disk hub 38 to shift freely on the main hub 41, thereby insuring maximum freedom of release between the clutch surfaces in the disengaged condition of the clutch; and also facilitating easy removal of the driven clutch disk 33 from the assembly when it is desired to renew the friction facings 36, 36. As will hereinafter be described, the springs which normally tend to hold the brake engaged also operate through the mechanical interconnecting parts to normally hold the shiftable driving clutch plate 32 shifted to the right, in the clutch releasing position shown.

Referring now to the compressed air power unit, designated 45 in its entirety, this unit comprises an outer cylinder 46 within which slides a piston 47, and both of which rotate constantly with the driving fly wheel 15. The cylinder 46 is formed with an annular outer flange 48 which has its inner edge notched at 49 for a mounting fit within the mounting flange 27 extending from the ring or annulus 22. Referring to Figure 3, the rim flange 48 of the cylinder is provided with counterbored apertures 51 at spaced intervals for receiving through bolts 52 which pass back through apertures 53 in the annulus 22. The bolts 52 have heads 54 engaging the inner face of the annulus 22, and are held against rotation by keying pins 55 passing through these heads and seating in corresponding recesses in the annulus 22. Nuts 56 screw over the threaded outer ends of the through bolts 52 and lie in counterbores or pockets 57 formed in the front face of the cylinder rim 48. These through bolts 52 serve to tie the compressed air cylinder 46 to the rotating fly wheel 15 through the intervention of the annulus or mounting ring 22. In addition, these through bolts 52 function as guides for guiding the axial shifting movement of the shiftable driving clutch plate 32, such guided relation being established by the through bolts passing through guide apertures 58 (Figure 3) formed at spaced points in the projecting flange portion 34 of the clutch plate 32.

The piston 47 of the power unit is provided with one or more sealing rings 61 and 62, such as neoprene or the like, which have a sliding fit with the inner cylindrical wall 63 of the compressed air cylinder 46. The sliding movement of the piston 47 is transmitted to the shiftable clutch plate 32 through a plurality of angularly spaced push pins 65 which have reduced inner ends 66 (Figure 1) that are pressed into reamed holes 67 formed in bosses 68 projecting forwardly from the clutch plate 32. After this series of push pins 65 have been pressed into the reamed holes 67, the push pins are all ground to equal height, thus making it possible to assemble the cylinder and piston to the driving clutch plate assembly 31, 32, without requiring aligning dowels between the piston 47 and shiftable clutch plate 32. This construction also serves to better insulate the piston 47 from the heat that is generated in the shiftable clutch plate 32 when the clutch is engaged, because heat will not flow through the separate push pin studs 66 as readily as it would flow through integral bosses.

The compressed air is admitted to and exhausted from the cylinder 46 through a combined rotary seal and flow control valve assembly indicated in its entirety at 71. This assembly is mounted directly upon the outer side of the rotating cylinder 46, in registry with a relatively large axial port 72 formed in the cylinder head, and through which the air admission and exhaust occurs. The rotating portion of the rotary seal comprises a mounting ring 73 which is secured to a mounting boss 74 on the cylinder head by cap screws 75 passing through the mounting ring and threading into the boss. A tubular stem 76 is secured to the mounting ring 73, such as by the screws 77, and this stem carries two axially spaced anti-friction bearings 80 for mounting the non-rotating portion of the rotary seal. This non-rotating portion comprises an exhaust annulus or housing 78 formed with an outer peripheral edge which has a free running fit within the rotating mounting ring 73. The annular exhaust chamber or passageway 81 in this housing 78 discharges through outlet 82. Bolted, or otherwise secured to the outer face of the non-rotating housing 78, is an air inlet housing 84 to which the compressed air is admitted from the electric control valve, which may be mounted on the inlet housing 84 or located in immediate proximity thereto so as to reduce to a minimum the length of the air passageway between the control valve and the interior of the cylinder 46.

The tubular stem portion 76 is formed at its inner end with the cylindrical head portion 87 in which slides the piston head 88 of an exhaust poppet valve 89. A sealing ring 91 carried by this valve head is adapted to have seating engagement with a conical port or valve surface 92 surrounding the axial opening 72, in which position communication is cut off between the cylinder and the discharge passageway 81. The poppet valve comprises a tubular shank 93 extending outwardly through the tubular stem 76, which shank is provided with an orifice 94, that may be restricted if desired, through which the compressed air is adapted to enter the cylinder through the center of the poppet valve. Radially extending vanes 95 mounted in the outer end of the valve shank 93 have sliding guiding engagement within the tubular stem 76. It will be understood that when compressed air is admitted through the air admission housing 84 the poppet valve is immediately shifted to the left for closing the exhaust outlet, so that all air entering the cylinder is effective on the piston 47. When air pressure is released from the admission chamber 84, the pressure of the air within the cylinder acting outwardly against the poppet valve 89 immediately unseats this valve from the valve seat 92, so that a very rapid exhaust of the compressed air can occur through the passageways 81 and 82 to atmosphere. A very similar form of this rotary seal and flow control valve assembly 71 is disclosed in my copending application, Serial No. 277,509, filed March 19, 1952, now Patent No. 2,747,714, to which attention is directed for further details.

Referring now to the brake mechanism of my invention, this is designated 101 in its entirety in the embodiment illustrated in Figure 1, and is mounted entirely between the supporting frame 10 of the machine and the driving fly wheel 15. The brake mechanism 101 comprises a non-rotating laterally flexible brake disk 102 which is adapted to be gripped between a pair of cooperating brake plates 103 and 104 which rotate with the driven shaft 11. The laterally flexible non-rotating brake disk 102 is preferably made up of a plurality of segments from which extend flexible mounting fingers 105. Secured in apertures in these flexible mounting fingers are threaded bushings 106 through which pass cap screws 107. The threaded inner ends of these cap screws thread into tapped bores 108 which are provided either in the supporting frame 10 itself, or in a suitable anchoring element associated therewith, such as the anchoring spider 109. The latter constitutes part of the lubricant retaining ring 111 which is secured over the end of the frame bearing hub 10 by the cap screws 112. A locking nut 114 screws over the external thread on the tubular bushing 106 and serves to lock the bushing and spring finger 105 in different inwardly or outwardly adjusted positions by having jam abutment against the anchoring member 109. The arcuate segments of the brake disk are provided with renewable friction facings 115 on opposite sides thereof, and anchored thereto as by rivets 116, and these segments may be provided with an interlocking arrangement at their adjacent ends, such general relation of laterally flexible segments and interlocking relation between the ends of the segments being shown in my prior Patents Nos. 2,259,461, 2,303,201 and 2,753,032. This construction employing a plurality of separable interlocking segments enables the non-rotating brake disk 102 to be quickly and easily removed for renewing the friction facings or the entire segments, without disturbing any part of the fly wheel or clutch assemblies.

The inner and outer brake plates 103 and 104 are mounted upon a common brake hub 121 which is secured to the shaft portion 11a, such as by the driving key 122. The hub of the outer brake plate 104 is keyed to the main brake hub 121, such as by providing the brake plate hub with a plurality of splines 124 fitting in key ways 125 in the main hub 121. An internally threaded collar 126 screws over the threaded outer end of the hub 121 and holds the brake plate hub against axial shifting.

The inner brake plate 103 has its hub 128 mounted for axial shifting movement and also limited angular rotative movement relatively to the main hub 121. At angularly spaced intervals this brake plate hub 128 is provided with apertures in which are mounted tubular bushings or sleeves 129. Each tubular bushing is fixedly anchored in its respective aperture by the engagement of a shoulder on the bushing against the outer end of the aperture and by the engagement of a peened over end of the bushing against the inner end of the aperture. Each bushing contains a compression spring 132 which has its outer end bearing against the closed outer head portion of the bushing and which has its inner end seating in an enlarged pocket 133 formed in the outer face of a radial flange 134 projecting from the inner end of the main brake hub 121. The outwardly projecting closed end of each bushing 129 passes through an opening 135 formed in the hub portion of the outer brake plate 104. Referring to Figure 4, it will be seen that each of these openings 135 is elongated laterally to permit some relative rotative movement of the bushing 129 in the opening 135. In this same regard, it will be noted that the relatively large size of each pocket 133 permits the inner end of each compression spring 132 to have limited sliding rotative movement in its respective pocket 133, during the time that the limited rotative movement is occurring between the inner brake plate 103 and the main mounting hub 121. Such relative rotative movement is utilized in connection with ball cam mechanism 137 to produce a self-energizing action in the brake when it is engaged under the action of the compression springs 132. This ball cam mechanism comprises a series of angularly spaced balls 139, preferably six in number, which are mounted in confining pockets formed with inclined cam surfaces 141 and 142, as shown in broken-away section in Figure 1. The cam track 141 is formed in the outwardly facing front surface of the brake hub flange 134, and the opposite cam track 142 is formed in the inwardly facing inner surface of the brake plate hub 128. These six ball-cam assemblies are located at equally spaced points between the successive compression spring bushing assemblies 129, 132. The ball-cam mechanism illustrated in the broken-away section in Figure 1 is one of the ball-cam mechanisms lying to the rear or back of the section plane of Figure 1. The direction of rotation of the driven shaft 11 is shown as being counterclockwise, as viewed from the outer end of the shaft and as represented by the directional arrow 144. Based upon this direction of rotation, it will be seen that when the compression springs 132 are allowed to shift the inner brake plate 103 in an outward direction against the non-rotating brake disk 102, there will be dragging force exerted by the brake disk tending to drag the brake plate in a clockwise direction relatively to the counterclockwise direction of rotation of the brake hub 121 and its associated cam tracks 141. The relative rotative movement between the cooperating pairs of cam tracks 141 and 142 tends to roll the balls in an uphill direction in the sense that the balls tend to exert a separating force between the hub flange 134 and brake plate hub 128, thereby shifting the inner brake plate 103 in an outward direction for exerting greater braking force tending to bind the brake disk 102 between the brake plates 103 and 104. When the brake is released by the transmission of inward thrusting force against the outer heads of the tubular bushings 129, the ball cam mechanisms 137 return to their normal positions. Because such ball-cam mechanisms substantially augment the brake engaging force, and also provide an effective anchorage for the floating brake plate 103, I preferably employ them in the present mechanism, but they are not essential as this mechanism will operate very effectively without them. Further details of such ball-cam mechanisms are disclosed in my prior Patents 2,200,597, 2,308,679 and 2,341,416.

Referring now to the interconnecting mechanism which passes through the fly wheel 15 and serves to interconnect the clutch and brake mechanisms for effecting release of the brake when the clutch is engaged and vice versa, this interconnecting mechanism is designated 151 in its entirety and comprises a thrusting plate 152 mounted on the inner side of the driving fly wheel 15 for transmitting inward thrusting force to the heads of the spring containing bushings 129. An inner flange 153 on this thrusting plate is adapted to transmit thrusting force through a composition type of anti-friction thrust ring 154 carried by an angle shaped metallic thrust ring 155 slidably mounted upon the threaded collar 126. The composition thrust ring 154 may be composed of fiber impregnated with graphite, or of other suitable material. The metallic thrust ring 155 is adapted to have abutment directly against the closed end heads of the spring containing bushings 129.

Figure 1A illustrates a modification of this part of the construction. In such modified construction, riveting pins 156 are provided for securing each spring containing bushing 129 to the thrust ring 155; also, spring thrust pins 160 are provided for transmitting the thrust of each compression spring 132 against the bottom of its respective pocket 133 in flange 134. Referring first to the riveting pins 156, each of these comprises a head portion 156a, a reduced shank portion 156b and a riveted-over end 156c. The head portion 156a passes through a central hole in the closed end of the spring containing bushing 129, and may, if desired, extend into the bushing to center the adjacent end of the compression spring 132. The reduced shank portion 156b passes through a similar hole in the thrust ring 155, and the end 156c is riveted over in a countersink in the thrust ring 155 to anchor the pin to this thrust ring. These riveting pins 156 insure that there will be no rotative slipping between the thrust ring 155 on the one hand, and the spring containing bushings 129 and brake plate 103 on the other hand. Thus, when the push plate 153 is moved to the left for releasing the brake, the counterclockwise rotation of this plate 153 imparts a counterclockwise torque to the thrust ring 155, and the pins 156 insure that this torque shall be transmitted through the spring containing bushings 129 to the brake plate 103, in addition to the end thrust which these bushings transmit to the brake plate, such rotative torque assisting in unlocking the ball cam mechanism 135. Referring to the spring thrust pins 160, these have rounded heads 160a which bear against the bottoms of the pockets 133. These rounded heads avoid abrasion and friction between the ends of the springs and the bottoms of the pockets in the limited angular rotative movement which can occur between the springs and the pockets in the operation of the ball cam mechanism 137.

The main thrusting plate 152 is mounted upon a plurality of slidable push rods 157, which have reduced threaded ends that are mounted in apertures in the thrusting plate by nuts 158. Each of these push rods 157 passes through an aperture in the web of the driving fly wheel, in which it has mounting in a guide bushing 159. Mounted on each push rod 157 is a compression spring 161 which has its outer end bearing against a polygonal head or nut 162 mounted on the push rod and which has its inner end abutting against the end of the counterbore 163 in the fly wheel. Each push rod is formed with a reduced extension 164 extending beyond the nut 162 and passing through an aperture 165 and into a counterbore 166 formed in the mounting ring 22 of the clutch assembly.

Mounted in alignment with the reduced end 164 of each push rod is an adjustable push stud 167 which is carried in the projecting flange portion 34 of the shiftable clutch plate 32. Each push stud 167 has a threaded shank which is adapted to be screwed back and forth in a threaded hole 168 in the flange 34, such being effected through a socket head 169 on the outer end of the stud. A lock nut 171 screws over the threaded shank of the stud and is adapted to have jam abutment against the inner face of the flange 34 for locking the adjustable push stud 167 in any position of adjustment. The nut 171 is accessible through the adjacent peripheral aperture 28 in the mounting flange 27. The socket head 169 of the push stud is also accessible through a front opening 172 in the rim flange 48 of the cylinder. A compression spring 174 is confined between the bottom of the counterbore 166 and the inner side of the nut 171. The series of compression springs 174 for the series of push studs tend to hold the clutch plate 32 and piston 47 shifted laterally to the right to the position shown. The several push studs 167 are so adjusted that the brake mechanism 101 will be released just before the clutch mechanism 21 becomes engaged. For example, this adjustment can be obtained by admitting compressed air to the cylinder for maintaining the clutch engaged, and then screwing the push studs 167 inwardly until the brake mechanism 101 is released just enough to show light on both sides of the non-rotating brake disc 102. The operation of the clutch and brake mechanism will be described after describing the modified embodiment of the invention illustrated in Figures 5 and 6.

In this modified embodiment illustrated in Figures 5 and 6, there are two driven clutch disks 33a and 33b embodied in the clutch mechanism 21. These two driven clutch disks are of identical construction, and both have splined slidable mounting 39 on the main clutch hub 41 in the same manner as described above of the single disk embodiment. Interposed between the two driven clutch disks 33a and 33b is an intermediate driving clutch plate 181 which has axially shiftable mounting on the through bolts 52' (Figure 6) which are made somewhat longer than the bolts 52 of Figure 3, in order to accommodate the greater axial dimension of the modified clutch construction. The intermediate driving clutch plate 181 preferably comprises two matching castings disposed back-to-back and having matching recessed areas in their opposing surfaces which form a hollow ventilated construction with radially extending air passageways 184 extending therethrough for inducing a centrifugal circulation of air through the intermediate driving clutch plate 181. In this modified embodiment the mounting ring 22 is formed with a considerably longer mounting flange 27' than in the single clutch disk embodiment previously described, such longer mounting flange being necessary to accommodate the greater axial length of the double disk embodiment. This longer mounting flange is provided with two annular rows of peripherally spaced apertures 28 and 28' disposed substantially in line with each of the two driven clutch disks 33a and 33b. In all other respects, the same clutch parts shown in the single disk embodiment can also be used in this double disk embodiment, and accordingly the same reference numerals have been applied to the corresponding parts.

With reference to the brake mechanism 101 in this modified embodiment, here again the same brake parts may be used as described above in connection with the single clutch disk embodiment, and the same reference numerals have been applied to corresponding parts. In this modified embodiment the flexible mounting fingers of the stationary brake disk are shown as being secured to a slightly different form of anchoring ring 186, which is, in turn, secured to the frame 10 of the machine.

With reference to the interconnecting mechanism 151, the same identical parts previously described can also be employed in the modified embodiment, with the exception that the nut 171 must be formed with an extension shank 171' to accommodate the greater axial length of the clutch. The outer end of the extension shank 171' has a threaded counterbore 188 into which screws the associated push stud 167. The polygonal inner head portion 171 is accessible through the associated opening 28 whereby this nut with its long tubular shank 171' still serves as a lock nut for locking the push stud 167 in its different positions of adjustment. Mounted in the bore of the tubular shank 171' is a spacer rod 191 provided with a head 192 at its inner end for abutment against the inner end of the associated push rod 164. By employing the spacer rods 191 I can still employ the same push rods 157, 164 and the same adjustable push studs 167 that are employed in the single disk embodiment previously described. The cylindrical holes 194 which are provided in the intermediate driving clutch plate 181 for receiving the tubular shanks 171' have a free sliding fit over these shanks. Compression springs 195 which are mounted on these tubular shanks 171' between the intermediate driving clutch plate 181 and the outer driving clutch plate 32 normally tend to shift the intermediate plate 181 inwardly against the shoulders of the lock nut heads 171, thereby insuring that when the clutch is in its released condition there will be ample clearance between the two driving clutch plates 181 and 32 to avoid frictional drag against the outer driven clutch disk 33b.

Figure 5A illustrates the same modification shown in Figure 1A as being applied to the construction of Figures 5 and 6. That is to say, the spring containing bushings 129 and the thrust ring 155 of this embodiment illustrated in Figures 5 and 6 are shown as being riveted or pinned together by pins 156 in the same manner described above in connection with Figure 1A. Spring thrust pins 160 having rounded heads 160a may also be provided for transmitting the thrust of the compression springs 132 against the bottoms of the pockets 133. The rounded heads minimize wear in the relative movement between the springs and the pockets.

The following description of the operation of my invention will be applicable to both embodiments. In the operation of releasing the brake and engaging the clutch, the admission of compressed air to the cylinder 46 thrusts the piston 47 inwardly toward the left, the piston 47, the adjustable push studs 167 and the main thrusting plate 152 all moving together toward the left as a unit. When the thrusting plate 152 moves far enough to have its flange 153 make contact with the thrust washer 154, motion is then transmitted through the thrust ring 155 to the heads of the series of spring sleeves or bushings 129, thereby shifting the inner brake plate 103 inwardly and releasing the brake. As soon as the brake is "off," further movement of the piston 47 closes the final clearances between the driving clutch plates 31 and 32 and the driven clutch disk 33 in Figure 1, or closes the final clearance between the driving clutch plates 31, 32 and 181 and the driven clutch disks 33a and 33b of Figure 5. The resulting engagement of the clutch follows or succeeds the release of the brake. Since the non-rotating flexible brake disk assembly 102 automatically centers its friction surfaces between the inner and outer brake plates 103 and 104 when the brake is released, there is no brake drag when the machine is running with the clutch engaged and the brake released.

The reverse operation of releasing the clutch and engaging the brake is essentially the reverse of the sequence of events described above. When the compressed air is cut off by the control valve, the poppet exhaust valve 89 immediately snaps away from its seat in the center of the cylinder head and permits an almost instantaneous release of pressure from within the cylinder. When the pressure releases, the brake springs 132 and the push stud springs 161 act together to force the driving clutch plates and the driven clutch disks apart and release the clutch. As soon as a running clearance has been established between the driving clutch plates and the driven clutch disks, the pressure of the brake springs 132 is then transferred to the inner brake plate 103 which starts to grip the laterally flexible brake disk 102. The resulting braking retardation acting on the inner brake plate 103 causes relative angular movement between this brake plate and the brake hub flange 134, so that the ball cam mechanisms 137 immediately become effective to augment the operation of engaging the brake. This augmented gripping action brings the driven shaft and associated parts to a quick and positive stop. Meanwhile, the push stud springs have forced the clutch plates and clutch disks further apart, have returned the piston 47 to its outermost position, and have established a running clearance between thrusting plate 152 and thrust washer 154. Thus, all of the clutch and brake parts are restored to the relative positions shown in Figures 1 and 5, with the main shaft 11 firmly held against rotation, but with the fly wheel 15 and associated parts free to revolve without drag or heating of the clutch parts.

As previously described, the several push studs 167 are preferably so adjusted that the brake mechanism 101 will be released just before the clutch mechanism 21 becomes engaged, this being true of both embodiments. The manner of adjusting these push studs 167 is substantially the same in both embodiments. For example, compressed air is admitted to the cylinder for maintaining the clutch engaged, and with the clutch thus held engaged the push studs 167 are adjusted inwardly until the brake mechanism 101 is released just enough to show light on both sides of the non-rotating brake disk 102. In the embodiment illustrated in Figure 1, the push studs are locked in these adjusted positions by the lock nuts 171 which are accessible through the peripheral apertures 28 in the mounting flange 27. In the embodiment illustrated in Figure 5, the push studs are also locked in their adjusted positions by the lock nuts 171 which act through their extension shanks 171' to effect locking abutment against the inner face of the shiftable clutch plate flange 34. In the embodiment of Figure 5, the nuts or head portions 171 are also accessible through the associated openings 28 formed in the mounting flange 27'. In the adjustment of these adjusting studs, performed through the openings 172 in the outer face of the cylinder, it may be desirable to check the uniformity of adjustment of the several adjusting studs, which may be done by arranging a dial indicator to act on the face of the thrust plate 152, or by marking a small scribe or crayon mark on the periphery of the thrusting plate to indicate true alignment or wobble.

It is obvious from the foregoing that in each of the disclosed embodiments the push plate 153, thrust washer 154 and thrust ring 155 function as a thrust transmitting connection for transmitting thrust from the push rods 157 to the shiftable brake plate 103. In the embodiments shown in Figures 1A and 5A these same elements 153, 154 and 155 also function in the additional capacity of a supplementary or primary torque transmitting clutch for transmitting torque from the fly wheel 15 to the relatively rotatable and shiftable brake plate 103. Whenever compressed air is admitted to the cylinder 46, this supplementary clutch 133, 135 engages in a torque transmitting connection, concurrently with its thrust transmitting connection, whereby it transmits torque from the fly wheel 15 to the relatively rotatable brake plate 103, preferably slightly before the full torque transmitting engagement of the main clutch 31—33. This torque transmitting connection of the supplemental clutch 153—155 transmits torque in a driving direction to the relatively rotatable brake plate 103 for releasing the ball cam mechanism 137 and for releasing the brake. Following this brake releasing function, the supplemental clutch 153—155 supplements the action of the main clutch 31—33 for transmitting torque from the fly wheel 15 to the driven shaft 11.

While I have illustrated and described what I regard to be the preferred embodiments of my invention, nevertheless it will be understood that such are merely exemplary and that numerous modifications and rearrangements may be made therein without departing from the essence of the invention.

I claim:

1. In mechanically interconnected clutch and brake mechanism for controlling the starting and stopping of a power driven shaft rotatably mounted in a supporting frame, the combination of a power driven fly wheel rotatably mounted on said shaft and normally having continuous rotation thereon, brake mechanism interposed between said fly wheel and said frame and operative when engaged to exert a braking force on said shaft, self-energizing mechanism for increasing the pressure of braking engagement as soon as said brake mechanism starts operating, clutch mechanism mounted on the outer side of said fly wheel and operative to clutch said fly wheel to said shaft, a compressed air power unit comprising a cylinder and piston mounted outwardly of said clutch mechanism and outwardly of the end of said shaft and operatively connected to actuate said clutch mechanism, motion transmitting rods extending from said clutch mechanism through said fly wheel for actuating said brake mechanism, said motion transmitting rods rotating continuously with said fly wheel, and supplementary clutch mechanism responsive to said motion transmitting rods for transmitting rotational torque from said fly wheel to said self-energizing mechanism for releasing the latter.

2. In mechanically interconnected clutch and brake mechanism for controlling the starting and stopping of a power driven shaft rotatably mounted in a supporting frame, the combination of a power driven fly wheel rotatably mounted on said shaft, and normally having continuous power driven rotation thereon, brake mechanism interposed between said fly wheel and said frame and operative when engaged to exert a braking force on said shaft, self-energizing mechanism rotating with said driven shaft and arranged for increasing the pressure of braking engagement as soon as said brake mechanism starts operating, clutch mechanism mounted on the outer side of said fly wheel and operative to clutch said fly wheel to said shaft, a compressed air power unit comprising a cylinder and piston mounted outwardly of said clutch mechanism and outwardly of the end of said shaft and operatively connected to actuate said clutch mechanism, motion transmitting rods extending through said fly wheel for actuation from said power unit, said rods passing through outwardly spaced holes in said fly wheel and rotating continuously therewith, and supplemental clutch mechanism responsive to said rods for transmitting shifting motion from said compressed air power unit to said brake mechanism and also transmitting torque in a releasing direction from said fly wheel to said self-energizing mechanism for releasing the latter.

3. In mechanically interconnected clutch and brake mechanism for controlling the starting and stopping of a power driven shaft rotatably mounted in a supporting frame, the combination of a power driven fly wheel rotatably mounted on said shaft and normally having continuous rotation thereon, brake mechanism interposed between said fly wheel and said frame and operative when engaged to exert a braking force on said shaft, self-energizing mechanism arranged for increasing the pressure of braking engagement as soon as said brake mechanism starts operating, said self-energizing mechanism comprising two relatively rotatable spreading elements and a rolling spreading element therebetween, all of which elements rotate directly with said power driven shaft, clutch mechanism mounted on the outer side of said fly wheel and operative to clutch said fly wheel to said shaft, a compressed air power unit comprising a cylinder and piston mounted outwardly of said clutch mechanism and outwardly of the end of said shaft and connected with said fly wheel to rotate continuously therewith, said power unit being operatively connected to actuate said clutch mechanism, and motion transmitting mechanism interconnecting said clutch mechanism with said brake mechanism including a supplemental clutch for transmitting torque in a releasing direction from said fly wheel to said self-energizing mechanism for releasing the latter.

4. In mechanically interconnected clutch and brake mechanism for controlling the starting and stopping of a power driven shaft rotatably mounted in a supporting frame, the combination of a power driven fly wheel rotatably mounted on said shaft and normally having continuous rotation thereon, brake mechanism interposed between the inner side of said fly wheel and said frame and operative when engaged to exert a braking force on said shaft, said brake mechanism comprising an axially shiftable brake element clutch mechanism mounted on the outer side of said fly wheel and operative to clutch said fly wheel to said shaft, said clutch mechanism comprising an axially shiftable clutch element, a compressed air power unit comprising a cylinder and piston mounted outwardly of said clutch mechanism and outwardly of the end of said shaft and having said cylinder secured to said fly wheel to rotate continuously therewith, said piston being operatively connected to actuate said clutch mechanism, motion transmitting mechanism for shiftably interconnecting the shiftable clutch element of said clutch mechanism and the shiftable brake element of said brake mechanism, and ball cam mechanism rotating with said power driven shaft and responsive to said motion transmitting mechanism for operating said brake mechanism.

5. In mechanically interconnected clutch and brake mechanism for controlling the starting and stopping of a power driven shaft which is rotatably mounted in a supporting frame and which has one end projecting from said frame, the combination of a continuously rotating power driven fly wheel rotatably mounted on the projecting end of said shaft, brake mechanism interposed between the inner side of said fly wheel and said frame and operative when engaged to transmit brake reaction force from said shaft to said frame, clutch mechanism mounted on the outer side of said fly wheel and having coacting friction clutch surfaces operative to clutch said fly wheel to said shaft, a compressed air power unit comprising a cylinder and piston carried by said fly wheel to rotate continuously therewith and mounted outwardly of said clutch mechanism, said power unit being operatively connected with said clutch mechanism to actuate the latter, and mechanical interconnecting mechanism extending between said clutch mechanism and said brake mechanism at radii spaced outwardly of said coacting friction clutch surfaces and operative to release said brake mechanism before said clutch mechanism is engaged and operative to release said clutch mechanism before said brake mechanism is engaged.

6. In mechanically interconnected clutch and brake mechanism for controlling the starting and stopping of a power driven shaft which is rotatably mounted in a supporting frame and which has one end projecting from said frame, the combination of a continuously rotating power driven fly wheel rotatably mounted on the projecting end of said shaft, brake mechanism interposed between the inner side of said fly wheel and said frame and operative when engaged to transmit a brake reaction force from said shaft to said frame, said brake mechanism comprising an axially shiftable brake disk clutch mechanism mounted on the outer side of said flywheel and having coacting friction clutch surfaces operative to clutch said fly wheel to said shaft, said clutch mechanism comprising an axially shiftable clutch disk spring means normally tending to hold said brake mechanism engaged and said clutch mechanism released, a compressed air power unit comprising a cylinder and piston carried by said fly wheel and rotating continuously therewith, said power unit being operative to engage said clutch mechanism when energized, and mechanical motion transmitting mechanism for shiftably interconnecting the shiftable clutch disk of said clutch mechanism and the shiftable brake disk of said brake mechanism on opposite sides of said fly wheel at radii spaced outwardly of said coacting friction clutch surfaces and of said axially shiftable clutch disk, said motion transmitting mechanism being operative to release said brake prior to engaging said clutch when said power unit is energized, and being operative to release said clutch prior to engaging said brake mechanism under the action of said spring means when said power unit is deenergized.

7. In mechanically interconnected clutch and brake mechanism for controlling the starting and stopping of a power driven shaft which is rotatably mounted in a supporting frame and which has one end projecting from said frame, the combination of a continuously rotating power driven fly wheel rotatably mounted on the projecting end of said shaft, brake mechanism interposed between said fly wheel and said frame and operative when engaged to transmit a brake reaction force from said shaft to said frame, clutch mechanism mounted on the outer side of said fly wheel comprising coacting driving and driven clutch elements operative to clutch said fly wheel to said shaft, spring means normally tending to hold said brake mechanism engaged and said clutch mechanism released, a compressed air power unit comprising a cylinder and piston carried by said fly wheel and rotating continuously therewith, said power unit being operative to engage said clutch mechanism when energized, and mechanical motion transmitting mechanism interconnecting said clutch mechanism and said brake mechanism on opposite sides of said fly wheel at radii spaced outwardly of said driven clutch element for causing alternate operation of said clutch mechanism and said brake mechanism under the action of said spring means and under the action of said power unit, said motion transmitting mechanism comprising adjustable means for adjusting the timed relationship between the release of said brake mechanism and the engagement of said clutch mechanism when said power unit is energized.

8. In mechanically interconnected clutch and brake mechanism for controlling the starting and stopping of a power driven shaft which is rotatably mounted in a supporting frame and which has one end projecting from said frame, the combination of a continuously rotating power driven fly wheel rotatably mounted on the projecting end of said shaft, brake mechanism interposed between said fly wheel and said frame and operative when engaged to transmit a brake reaction force from said shaft to said frame, clutch mechanism mounted on the outer side of said fly wheel and operative to clutch said fly wheel to said shaft, spring means normally tending to hold said brake mechanism engaged and said clutch mechanism released, a compressed air power unit comprising a cylinder and piston carried by said fly wheel and rotating continuously therewith, said power unit being operative to engage said clutch mechanism when energized, mechanical motion transmitting mechanism interconnecting said clutch mechanism with said brake mechanism on opposite sides of said fly wheel whereby said brake is released when said clutch is engaged and said brake is engaged when said clutch is released, and self-energizing means rotating with said power driven shaft for augmenting the action of said spring means in the brake engaging operation, said self-energizing means being released by said motion transmitting mechanism.

9. In mechanically interconnected clutch and brake mechanism for controlling the starting and stopping of a power driven shaft which is rotatably mounted in a supporting frame and which has one end projecting from said frame, the combination of a continuously rotating power driven fly wheel rotatably mounted on the projecting end of said shaft, brake mechanism interposed between said fly wheel and said frame and operative when engaged to transmit a brake reaction force from said shaft to said frame, clutch mechanism mounted on the outer side of said fly wheel comprising coacting driving and driven clutch elements operative to clutch said fly wheel to said shaft, spring means normally tending to hold said brake mechanism engaged and said clutch mechanism released, a compressed air power unit comprising a cylinder and piston carried by said fly wheel and rotating continuously therewith, said power unit being operative to engage said clutch mechanism when energized, and mechanical motion transmitting mechanism interconnecting said clutch mechanism with said brake mechanism on opposite sides of said fly wheel at a radius lying beyond the outer periphery of one of said clutch elements for causing release of said brake mechanism in the operation of engaging said clutch mechanism and for causing release of said clutch mechanism in the operation of engaging said brake mechanism, said motion transmitting mechanism comprising adjustable push stud means for adjusting the timed relationship between the operation of the clutch and brake mechanisms.

10. In mechanically interconnected clutch and brake mechanism for controlling the starting and stopping of a power driven shaft which is rotatably mounted in a supporting frame and which has one end projecting from said frame, the combination of a continuously rotating power driven fly wheel rotatably mounted on the projecting end of said shaft, brake mechanism interposed between said fly wheel and said frame and operative when engaged to transmit a brake reaction force from said shaft to said frame, clutch mechanism mounted on the outer side of said fly wheel comprising coacting driving and driven clutch elements operative to clutch said fly wheel to said shaft, spring means normally tending to hold said brake mechanism engaged and said clutch mechanism released, a compressed air power unit comprising a cylinder and piston carried by said fly wheel and rotating continuously therewith, said power unit being operative to engage said clutch mechanism when energized, and mechanical motion transmitting mechanism interconnecting said clutch mechanism and said brake mechanism comprising a thrust plate mounted on the inner side of said fly wheel and operative upon inward thrusting movement to release said brake mechanism, thrust rods connected with said thrusting plate and extending through said fly wheel at radii lying beyond the outer periphery of said driven clutch element, and push studs associated with said clutch mechanism and responding to inward motion of said piston for transmitting inward motion to said thrusting rods.

11. In mechanically interconnected clutch and brake mechanism for controlling the starting and stopping of a power driven shaft which is rotatably mounted in a supporting frame and which has one end projecting from said frame, the combination of a continuously rotating power driven fly wheel rotatably mounted on the projecting end of said shaft, brake mechanism interposed between said fly wheel and said frame and operative when engaged to transmit a brake reaction force from said shaft to said frame, clutch mechanism mounted on the outer side of said fly wheel comprising coacting driving and driven clutch elements operative to clutch said fly wheel to said shaft, said clutch mechanism comprising a shiftable clutch plate rotating with said fly wheel, spring means normally tending to hold said brake mechanism engaged and said clutch mechanism released, a compressed air power unit comprising a cylinder and piston carried by said fly wheel and rotating continuously therewith, said power unit being operative to engage said clutch mechanism when energized, and mechanical motion transmitting mechanism interconnecting said clutch mechanism with said brake mechanism comprising a thrust plate mounted on the inner side of said fly wheel and operative upon inward thrusting movement to release said brake mechanism, thrust rods connected with said thrust plate and extending through holes in said fly wheel at radii beyond the periphery of said driven clutch elements, and adjustable push studs carried by said shiftable clutch plate and responding to inward motion of said clutch plate for transmitting inward motion to said thrusting rods, said push studs being adjustable from the outer side of said clutch mechanism for adjusting the timing of brake release and clutch engagement.

12. In mechanically interconnected clutch and brake mechanism for controlling the starting and stopping of a power driven shaft which is rotatably mounted in a supporting frame and which has one end projecting from said frame, the combination of a power driven fly wheel rotatably mounted on the projecting end of said shaft, brake mechanism interposed between said fly wheel and said frame and operative when engaged to transmit a brake reaction force from said shaft to said frame, said brake mechanism comprising a thrust collar operative upon inward thrusting movement to cause engagement of said brake mechanism, clutch mechanism mounted on the outer side of said fly wheel and operative to clutch said fly wheel to said shaft, said clutch mechanism comprising inner and outer driving clutch plates rotating with said fly wheel and an intermediate driven clutch disk mounted on said shaft, said outer driving clutch plate being axially shiftable for effecting engagement of the clutch, a compressed air power unit comprising a cylinder and piston carried by said fly wheel and rotating directly therewith, said power unit being operative to engage said clutch mechanism when energized, mechanical motion transmitting mechanism interconnecting said clutch mechanism with said brake mechanism on opposite sides of said fly wheel comprising a plurality of push rods passing through and slidably mounted in said fly wheel, a thrust plate mounted on the inner ends of said push rods and adapted to transmit inward thrusting motion against said thrust collar of said brake mechanism, adjustable push studs having threaded mounting in said outer shiftable clutch plate and adapted to transmit inward thrusting motion against the ends of said push rods, brake engaging springs associated with said brake mechanism normally tending to hold said brake mechanism engaged, shifter springs associated with said thrust rods normally tending to shift said thrust rods and thrust plate outwardly with the latter normally spaced from said thrust collar, and spacer springs acting between said driving clutch plates normally tending to hold said driving clutch plates separated with the clutch mechanism released.

13. In mechanically interconnected clutch and brake mechanism for controlling the starting and stopping of a power driven shaft which is rotatably mounted in a supporting frame and which has one end projecting from said frame, the combination of a power driven fly wheel rotatably mounted on the projecting end of said shaft, brake mechanism interposed between said fly wheel and said frame and operative when engaged to transmit a brake reaction force from said shaft to said frame, said brake mechanism comprising a brake engaging thrust collar, clutch mechanism mounted on the outer side of said fly wheel and operative to clutch said fly wheel to said shaft, said clutch mechanism comprising an inner non-shiftable driving clutch plate, an outer shiftable driving clutch plate, and an intermediate floating driving clutch plate, an inner driven clutch disk between said inner and intermediate driving clutch plates, an outer driven clutch disk between said intermediate and outer driving clutch plates, a compressed air power unit comprising a cylinder and piston carried by said fly wheel and rotating directly therewith, said piston being operative to impart inward shifting movement to said outer shiftable clutch plate when said power unit is energized, brake engaging spring means normally tending to hold said brake mechanism engaged, and mechanical motion transmitting mechanism interconnecting said clutch mechanism with said brake mechanism on opposite sides of said fly wheel for causing release of said brake mechanism in the operation of engaging said clutch mechanism and for causing release of said clutch mechanism in the operation of engaging said brake mechanism, said motion transmitting mechanism comprising a plurality of push rods passing through and having slidable mounting in said fly wheel, a thrust plate mounted on the inner ends of said push rods adapted to have inward thrusting engagement against said thrust collar, compression springs mounted on said thrust rods normally tending to push said thrust rods outwardly and to hold said thrust plate separated from said thrust collar, adjustable push studs having threaded mounting in said outer shiftable clutch plate, tubular members passing through said intermediate floating clutch plate and having threaded bores at their outer ends screwing over said adjustable push studs and abutting against said outer shiftable clutch plate, the inner ends of said tubular members having shoulders adapted to abut against the inner side of said intermediate floating clutch plate, spacer rods mounted in said tubular members for transmitting inward thrusting movement from said adjustable push studs to said thrust rods, and compression springs confined between said inner driving clutch plate and said floating clutch plate and between said outer driving clutch plate and said floating clutch plate normally tending to hold the latter in an intermediate floating position when the clutch is released.

14. In mechanically interconnected clutch and brake mechanism for controlling the starting and stopping of a power driven shaft rotatably mounted in a supporting frame, the combination of a power driven fly wheel rotatably mounted on said shaft, and normally having continuous power driven rotation thereon, brake mechanism comprising two brake plates rotating with said driven shaft and adapted to engage stationary brake surfaces, one of said brake plates being axially shiftable, said brake mechanism being interposed between said fly wheel and said frame and operative when engaged to exert a braking force on said shaft, clutch mechanism mounted on the outer side of said fly wheel and operative to clutch said fly wheel to said shaft, a compressed air power unit comprising a cylinder and piston mounted outwardly of said clutch mechanism and outwardly of the end of said shaft and operatively connected to actuate said clutch mechanism, motion transmitting rods extending through said fly wheel for actuation from said power unit, said rods passing through outwardly spaced holes in said fly wheel and rotating continuously therewith, ball cam mechanism responsive to said rods for operating said brake mechanism, said ball-cam mechanism comprising sloping cam tracks one of which is carried by said axially shiftable brake plate, balls rolling between said cam tracks, said axially shiftable brake plate being capable of limited rotation relatively to the other brake plate for causing said ball cam mechanism to act, and means for transmitting end thrust and rotative torque from said motion transmitting rods to said shiftable brake plate in the operation of releasing said brake mechanism.

15. In mechanically interconnected clutch and brake mechanism for controlling the starting and stopping of a power driven shaft rotatably mounted in a supportnig frame, the combination of a power driven fly wheel rotatably mounted on said shaft and normally having continuous rotation thereon, brake mechanism interposed between said fly wheel and said frame and operative when engaged to exert a braking force on said shaft, said brake mechanism comprising a brake plate mounted to rotate with said driven shaft but capable of limited rotative and shifting movement relatively thereto, spring means normally tending to engage said brake mechanism, clutch mechanism mounted on the outer side of said fly wheel and operative to clutch said fly wheel to said shaft, a compressed air power unit comprising a cylinder and piston mounted outwardly of said clutch mechanism and outwardly of the end of said shaft and having said cylinder secured to said fly wheel to rotate continuously therewith, said piston being operatively connected to actuate said clutch mechanism, motion transmitting mechanism for interconnecting said clutch mechanism and said brake mechanism, ball cam mechanism responsive to said motion transmitting mechanism for operating said brake mechanism, said ball cam mechanism comprising a first cam track rotating with said driven shaft and a second cam track rotating with said relatively rotatable and shiftable brake plate, a ball rolling between said cam tracks, and means for transmitting end thrust and rotative torque from said motion transmitting mechanism to said latter brake plate in the operation of releasing said brake mechanism.

16. In mechanically interconnected clutch and brake mechanism for controlling the starting and stopping of a power driven shaft rotatably mounted in a supporting frame, the combination of a power driven fly wheel rotatably mounted on said shaft and normally having continuous rotation thereon, brake mechanism interposed between the inner side of said fly wheel and said frame and operative when energized to exert a braking force on said shaft, said brake mechanism comprising a first brake disc rotating with said driven shaft, a second brake disc also rotating with said driven shaft but capable of limited axial shifting movement and limited angular rotative movement relatively to said first brake disc, and stationary brake surfaces adapted to be engaged by said first and second brake discs, self-energizing mechanism for increasing the pressure of braking engagement of said brake mechanism comprising a first cam track associated with said first brake disc, a second cam track associated with said second brake disc to be axially shiftable and relatively rotatable therewith, and a rolling element adapted to have rolling motion between said first and second cam tracks, clutch mechanism mounted on the outer side of said fly wheel and operative to clutch said fly wheel to said shaft, a compressed air power unit comprising a cylinder and piston connected with said fly wheel to rotate continuously therewith, said power unit being operatively connected to actuate said clutch mechanism, and means responsive to said compressed air power unit for transmitting axial shifting and relative rotative movement to said second cam track for releasing said self-energizing mechanism and said brake mechanism.

References Cited in the file of this patent
UNITED STATES PATENTS

| | | |
|---|---|---|
| 2,089,733 | Criley | Aug. 10, 1937 |
| 2,242,396 | Johansen | May 20, 1941 |
| 2,245,988 | Lambert | June 17, 1941 |
| 2,585,234 | Eason | Feb. 12, 1952 |